US007519954B1

(12) United States Patent
Beddoe et al.

(10) Patent No.: US 7,519,954 B1
(45) Date of Patent: Apr. 14, 2009

(54) SYSTEM AND METHOD OF OPERATING SYSTEM IDENTIFICATION

(75) Inventors: Marshall Beddoe, Dana Point, CA (US); Robin Keir, Mission Viejo, CA (US)

(73) Assignee: McAfee, Inc., Santa Clara, CA (US)

( * ) Notice: Subject to any disclaimer, the term of this patent is extended or adjusted under 35 U.S.C. 154(b) by 935 days.

(21) Appl. No.: 10/821,046

(22) Filed: Apr. 8, 2004

(51) Int. Cl.
G06F 9/44 (2006.01)
G06F 15/173 (2006.01)
G06F 11/00 (2006.01)

(52) U.S. Cl. .......................... 717/124; 709/224; 726/25
(58) Field of Classification Search ................. 717/124; 709/224; 726/26
See application file for complete search history.

(56) References Cited

U.S. PATENT DOCUMENTS

| | | | |
|---|---|---|---|
| 4,954,941 A | 9/1990 | Redman ...................... | 364/200 |
| 4,975,975 A * | 12/1990 | Filipski ....................... | 382/227 |
| 4,999,806 A | 3/1991 | Chernow et al. ............ | 364/900 |
| 5,237,614 A | 8/1993 | Weiss .......................... | 380/23 |
| 5,581,764 A | 12/1996 | Fitzgerald et al. .......... | 395/703 |
| 5,649,187 A | 7/1997 | Hornbuckle ................ | 395/610 |
| 5,699,275 A | 12/1997 | Beasley et al. ............. | 364/514 |
| 5,742,829 A | 4/1998 | Davis et al. ................. | 395/712 |
| 5,764,913 A | 6/1998 | Jancke et al. ........... | 395/200.54 |
| 5,771,347 A | 6/1998 | Grantz et al. ............... | 395/186 |
| 5,799,002 A | 8/1998 | Krishnan .................... | 370/234 |
| 5,805,897 A | 9/1998 | Glowny ....................... | 395/712 |
| 5,809,329 A | 9/1998 | Lichtman et al. ........... | 395/828 |
| 5,852,812 A | 12/1998 | Reeder ........................ | 705/39 |
| 5,854,794 A | 12/1998 | Pawlowski .................. | 370/509 |
| 5,860,012 A | 1/1999 | Luu ............................ | 395/712 |
| 5,919,247 A | 7/1999 | Van Hoff et al. ............ | 709/217 |

(Continued)

FOREIGN PATENT DOCUMENTS

| | | | |
|---|---|---|---|
| WO | WO 03/058457 | | 7/2003 |
| WO | WO 03107321 A1 * | | 12/2003 |
| WO | WO 2005/094490 | | 10/2005 |
| WO | WO 2006/049841 | | 5/2006 |
| WO | WO 2006/091425 | | 8/2006 |

OTHER PUBLICATIONS

Paul Asadoorian, "NetBios Null Sessions: The Good, The Bad, and The Ugly", Jun. 17, 2002, Brown University CIRT, accessed and printed Mar. 22, 2008 from <http://web.archive.org/web/20021216094821/http://www.brown.edu/Facilities/CIS/CIRT/help/netbiosnull.html>.*

(Continued)

*Primary Examiner*—Tuan Q Dam
*Assistant Examiner*—James Rutten
(74) *Attorney, Agent, or Firm*—Zilka-Kotab, PC

(57) ABSTRACT

An automated system performs multiple tests for identifying an operating system executed by a network node. A combination of multiple tests may be calibrated to generate an acceptably accurate operating system identification. An identification module makes an overall identification based on identifications of the tests. A plurality of identification rules may determine which of the individual tests is likely to be most accurate. The system also may include a conflict resolution module that resolves conflicts among the multiple tests. The conflict resolution module may employ a plurality of conflict resolution definitions that define special cases in which the general identification rules may be overridden to make an identification without regard to the general identification rules. Alternatively, the conflict resolution module may be configured to work in combination with the general identification rules to make an operating system identification.

43 Claims, 4 Drawing Sheets

U.S. PATENT DOCUMENTS

| | | | |
|---|---|---|---|
| 5,931,946 A | 8/1999 | Terada et al. | 713/201 |
| 5,933,646 A | 8/1999 | Hendrickson et al. | 395/712 |
| 5,933,826 A | 8/1999 | Ferguson | 707/9 |
| 5,974,454 A | 10/1999 | Apfel et al. | 709/221 |
| 5,987,611 A | 11/1999 | Freund | 713/201 |
| 5,991,802 A | 11/1999 | Allard et al. | 709/219 |
| 6,016,499 A | 1/2000 | Ferguson | 707/104 |
| 6,029,247 A | 2/2000 | Ferguson | 713/201 |
| 6,052,710 A | 4/2000 | Saliba et al. | 709/203 |
| 6,061,740 A | 5/2000 | Ferguson et al. | 709/246 |
| 6,073,214 A | 6/2000 | Fawcett | 711/133 |
| 6,078,945 A | 6/2000 | Hinsley | 709/105 |
| 6,094,679 A | 7/2000 | Teng et al. | 709/220 |
| 6,108,649 A | 8/2000 | Young et al. | 707/4 |
| 6,138,157 A | 10/2000 | Welter et al. | 709/224 |
| 6,151,643 A | 11/2000 | Cheng et al. | 710/36 |
| 6,151,708 A | 11/2000 | Pedrizetti et al. | 717/11 |
| 6,157,618 A | 12/2000 | Boss et al. | 370/252 |
| 6,202,207 B1 | 3/2001 | Donohue | 717/11 |
| 6,205,552 B1 | 3/2001 | Fudge | 713/201 |
| 6,219,675 B1 | 4/2001 | Pal et al. | 707/201 |
| 6,243,766 B1 | 6/2001 | Sliger et al. | 710/2 |
| 6,256,668 B1 | 7/2001 | Slivka et al. | 709/220 |
| 6,263,362 B1 | 7/2001 | Donoho et al. | 709/207 |
| 6,266,774 B1 | 7/2001 | Sampath et al. | 713/201 |
| 6,269,456 B1 | 7/2001 | Hodges et al. | 714/38 |
| 6,272,677 B1 | 8/2001 | Lam et al. | 717/11 |
| 6,279,113 B1 | 8/2001 | Vaidya | 713/201 |
| 6,279,156 B1 | 8/2001 | Amberg et al. | 717/11 |
| 6,281,790 B1 | 8/2001 | Kimmel et al. | 340/506 |
| 6,282,175 B1 | 8/2001 | Steele et al. | 370/254 |
| 6,282,546 B1 | 8/2001 | Gleichauf et al. | 707/102 |
| 6,282,709 B1 | 8/2001 | Reha et al. | 717/11 |
| 6,282,712 B1 | 8/2001 | Davis et al. | 717/11 |
| 6,298,445 B1 | 10/2001 | Shostack et al. | 713/201 |
| 6,301,668 B1 | 10/2001 | Gleichauf et al. | 713/201 |
| 6,307,841 B1 | 10/2001 | Rowles et al. | 370/252 |
| 6,324,656 B1 | 11/2001 | Gleichauf et al. | 714/37 |
| 6,334,190 B1 | 12/2001 | Silverbrook et al. | 713/500 |
| 6,347,375 B1 | 2/2002 | Reinert et al. | 713/200 |
| 6,493,871 B1 | 12/2002 | McGuire et al. | 717/173 |
| 6,519,703 B1 * | 2/2003 | Joyce | 726/22 |
| 6,546,493 B1 | 4/2003 | Magdych et al. | 713/201 |
| 6,584,569 B2 | 6/2003 | Reshef et al. | 713/201 |
| 6,618,717 B1 * | 9/2003 | Karadimitriou et al. | 706/61 |
| 6,721,713 B1 | 4/2004 | Guheen et al. | 705/1 |
| 6,751,661 B1 | 6/2004 | Geddes | 709/223 |
| 6,754,895 B1 | 6/2004 | Bartel et al. | 717/174 |
| 6,766,458 B1 | 7/2004 | Harris et al. | 713/201 |
| 6,789,202 B1 | 9/2004 | Ko et al. | 713/201 |
| 6,859,793 B1 | 2/2005 | Lambiase | 705/59 |
| 6,862,581 B1 | 3/2005 | Lambiase | 705/51 |
| 6,920,558 B2 | 7/2005 | Sames et al. | 713/166 |
| 6,976,068 B2 | 12/2005 | Kadam et al. | 709/223 |
| 7,000,247 B2 | 2/2006 | Banzhof | 726/2 |
| 7,003,561 B1 | 2/2006 | Magdych et al. | 709/223 |
| 7,069,581 B2 | 6/2006 | Fu et al. | 726/3 |
| 7,089,589 B2 | 8/2006 | Chefalas et al. | 726/22 |
| 7,096,503 B1 | 8/2006 | Magdych et al. | 726/25 |
| 7,124,181 B1 | 10/2006 | Magdych et al. | 709/224 |
| 7,146,642 B1 | 12/2006 | Magdych et al. | 726/22 |
| 7,152,105 B2 | 12/2006 | McClure et al. | 709/224 |
| 2001/0014150 A1 | 8/2001 | Beebe et al. | 379/189 |
| 2001/0034847 A1 | 10/2001 | Gaul, Jr. | 713/201 |
| 2002/0026591 A1 | 2/2002 | Hartley et al. | 713/201 |
| 2002/0083337 A1 | 6/2002 | Welcher et al. | 713/201 |
| 2002/0087882 A1 | 7/2002 | Schneier et al. | 713/201 |
| 2002/0100036 A1 | 7/2002 | Moshir et al. | 717/173 |
| 2002/0116639 A1 | 8/2002 | Chefalas et al. | 713/201 |
| 2002/0138271 A1 | 9/2002 | Shaw | 704/270 |
| 2002/0138608 A1 * | 9/2002 | Canis et al. | 709/224 |
| 2002/0147803 A1 | 10/2002 | Dodd et al. | 709/223 |
| 2002/0188481 A1 | 12/2002 | Berg et al. | 705/4 |
| 2003/0056113 A1 | 3/2003 | Korosec | 713/200 |
| 2003/0126472 A1 | 7/2003 | Banzhof | 713/201 |
| 2003/0135749 A1 | 7/2003 | Gales et al. | 713/200 |
| 2003/0140250 A1 | 7/2003 | Taninaka et al. | 713/201 |
| 2003/0163728 A1 | 8/2003 | Shaw | 713/201 |
| 2003/0195861 A1 * | 10/2003 | McClure et al. | 707/1 |
| 2003/0196097 A1 | 10/2003 | Korosec et al. | 713/185 |
| 2003/0208606 A1 | 11/2003 | Maguire et al. | 709/227 |
| 2003/0217039 A1 | 11/2003 | Kurtz et al. | |
| 2004/0003266 A1 | 1/2004 | Moshir et al. | 713/191 |
| 2004/0010709 A1 | 1/2004 | Baudion et al. | 713/201 |
| 2004/0015728 A1 | 1/2004 | Cole et al. | |
| 2004/0019803 A1 * | 1/2004 | Jahn | 713/201 |
| 2004/0078384 A1 | 4/2004 | Keir et al. | |
| 2004/0098621 A1 | 5/2004 | Raymond | 713/201 |
| 2004/0143753 A1 | 7/2004 | Hernacki et al. | 713/200 |
| 2004/0170153 A1 | 9/2004 | Stewart et al. | 370/338 |
| 2004/0221178 A1 | 11/2004 | Aaron et al. | 713/201 |
| 2005/0010821 A1 | 1/2005 | Cooper et al. | 713/201 |
| 2005/0022012 A1 | 1/2005 | Bluestone et al. | 713/201 |
| 2005/0044037 A1 | 2/2005 | Lawrence et al. | 705/38 |
| 2005/0044389 A1 | 2/2005 | Oliphant | 713/187 |
| 2005/0111466 A1 | 5/2005 | Kappes et al. | 370/400 |
| 2005/0125685 A1 | 6/2005 | Samuelson et al. | 713/200 |
| 2005/0138433 A1 | 6/2005 | Linetsky | 713/202 |
| 2005/0188419 A1 | 8/2005 | Dadhia et al. | 726/1 |
| 2005/0201297 A1 | 9/2005 | Peikari | 370/242 |
| 2005/0216957 A1 | 9/2005 | Banzhof et al. | 726/25 |
| 2006/0101517 A1 | 5/2006 | Banzhof et al. | 726/25 |
| 2006/0191012 A1 | 8/2006 | Banzhof et al. | 726/25 |
| 2006/0282388 A1 | 12/2006 | Solomon et al. | 705/52 |

OTHER PUBLICATIONS

Winfingerprint Scan Options, Oct. 11, 2002, accessed and printed Mar. 22, 2008 from <http://web.archive.org/web/20021011092203/http://winfingerprint.sourceforge.net/winfingerprint-help/scan-options.htm#null-sessions>.*

Smith and Abad, "Know Your Enemy: Passive Fingerprinting" Mar. 4, 2002 Honeynet Project.*

Remote OS detection via TCP/IP Stack FingerPrinting from www.insecure.org website, last modified Jun. 11, 2002.

Hacking Exposed: Network Security Secrets and Solutions, copyright 1998, pp. 51-54.

Request for Reexamination of U.S. Patent No. 7,000,247 filed on Mar. 2, 2006.

Office Action Summary from U.S. Appl. No. 10/810,927 which was mailed on Dec. 15, 2006.

Office Action Summary from U.S. Appl. No. 10/975,828 which was mailed on Nov. 15, 2006.

U.S. Appl. No. 11/009,782, filed Dec. 10, 2004.

U.S. Appl. No. 11/410,730, filed Apr. 25, 2006.

Wolfe et al., "Maintaining remote services and resources over the Internet and other networks" Jun. 10-12, 2002; IEEE, p. 137-138.

Peng Lui; "Engineering a distributed intrusion tolerant database system using COTS components" IEEE, vol. 2, Apr. 22-24, 2003, p. 284-289.

International Search Report and Written Opinion from PCT Application No. US05/09689 mailed Jan. 25, 2007.

CERT® Advisories, "CERT/CC Advisories 1988-200" http://web.archive.org/web/20000815055129/http://www.cert.org/advisories/ 2000, p. 1-34.

"Review SPQUERY", in Network Computing, Nov. 2000 www.networkcomputer.co.uk/back_iss/prod_update/reviews/spquery4.1.htm.

"Ready for Windows 2000 Service Pack 1? St. Bernards Software's SPQuery 4.0 is Here Just In Time," Business Wire, Aug. 2, 2000, www.findarticles.com/p/articles/mi_m0EIN/is_August_2/ai_63819686/print.

Edwards, Mark Joseph, "Useful SPQuery 3.0 automates Finding, installing hotfixes," Infoworld, Jun. 21, 1999 www.infoworld.com/cgi-bin/displayArchive.pl?/99/25/c04-25.46htm.
SPQuery Users Manuel, 1st. Quarter 2001.
WebConsole Core 4.0 for NetWare, archived May 11, 2000 Web.archive.org/web/200005111133746/www.patchlink.com/products/wenw_product....
"Gravitix The Patch Finder" archived Aug. 15, 2000 web.archive.org/web/20000815094824/www.patchlink.com/products/gravitix.asp.
"Network Vulnerability Assessment Report" archived Sep. 17, 2000 web.archive.org/web/20000917072109/documents.iss.net/literature/InternetScanner/reports/Line_Mgmt_Vulnerability_Assessment_Report.pdf.
"Host Vulnerability Summary Report" archived Sep. 17, 2000 web.archive.org/web/20000917072216/documents.iss.net/literature/InternetScanner/reports/Technician_Host-Vulnerability_Summary_Report.pdf.
"ISS SAFEsuite prodict: Internet Scanner" archived Aug. 20, 2000 web.archive.org/web/2000082023428/www.iss.net/securing_e-business/security_pr....
"To Setup Secure PC Network" archived Aug. 16, 2000 web.archive.org/web/20000816192628/www.citadel.com/downloads/SPC+readme.txt.
"Microsoft Security Glossary" Oct. 29, 2002 www.microsoft.com/security/glossary.mspx.
Stephen Swoyer, Hotfix Management Tools Maturing Nov. 19, 2001, ENT News.
"Systems Management Server Product Overview, Features" www.microsoft.com; Jan. 29, 2002.
Novel ZENworks Grows Up, Feb. 7, 2000.
www.thestandard.com article, Dec. 21, 2000.
Topaz white paper; copyright date 2000.
Topaz news release; Oct. 4, 1999.
www.freshtech.com web pages, pp. 1-8; copyright date 1996-2000.
"Benefits of Software Leasing"; Dec. 15, 1998.
"Leasing Software"; no later than Feb. 27, 2001.
Timbale pp. 1-4; Dec. 21, 2000.
"The Open Software Description Format (OSD)"; Aug. 11, 1997.
Computer Associate ManageIT news release; May 8, 2000.
www.sitepartrol.com pp. 1-2; no later than Nov. 28, 2001.
www.rhsolution.com pp. 1-4; no later than Jan. 8, 2001.
www.hotelhelpdesk.com pp. 1-4, no later than Jan. 8, 2001.
InfraDesk™ page; Dec. 21, 2000.
www.triactive.com page; no later than Nov. 28, 2001.
Webopedia.com definitions; copyright date 2001.
Technical Comparison of Systems Management Server 2.0 and Novell's ZENworks 2.0; copyright date 2000.
SafePatch Description , pp. 1-3; Oct. 2000.
SafePatch; Oct. 2000.
Marimba Castanet; copyright 2000.
www.shavlik.com pp. 1-12; copyright date 2001.
HFNetChk, pp. 1-21 copyright date 2001.
Welcome to Windows Update page; copyright date 2001.
Winfingerprint pp. 1-3; no later than Sep. 10, 2001.
Shipley, G. "Tools From the Underground", May 29, 2000.
Sourceforge.net pp. 1-2; copyright date 1999, 2000, 2001.
Robinson, C., "Patchlink.com Brings Remote Management Online", Dec. 4, 2000.
Coopee, "Building a strong foundation", Network World Fusion, Jan. 31, 2000.
"Q. What is Qchain.exe?" www.ntfaq.com; Jul. 23, 2001.
"Newly Released Patchlink Update 4.0 . . . " biz.yahoo.com; Oct. 14, 2002.
Burnback, "Patching up bad patches" www.zdnet.com; Nov. 22, 2002.
Mueller, "Patchlink Helps Keep Windows Closed" www.netowrkcomputing.com; Sep. 2, 2002.
Patchlink® Update™ 4.0 White Paper: Cross-platform Security Patch Management; Copyright date 2002.
Pages numbered as 1-27, from www.bigfix.com; no later than Nov. 25, 2002.
"UpdateEXPERT: Product Reviews & Testimonials" www.stbernard.com.
"SPQuery v4.1", www.networkcomputin.co.uk Nov. 2000.
"Ahead of the Service Pack", www.networkcomputing.co.uk ; Nov. 2000.
U.S. Appl. No. 10/975,828, filed Oct. 28, 2004.
U.S. Appl. No. 10/810,927, filed Mar. 25, 2004.

* cited by examiner

FIG. 4

Conflict Resolution Definitions 400

| TCP Fingerprint 402 | ICMP Fingerprint 404 | TCP Ports 406 | UDP Ports 408 | TCP Port & Banner 410 | UDP Port & Banner 412 | OS Description 414 | OS Code 416 |
|---|---|---|---|---|---|---|---|
| T40E8:4100:4080: 0586:0:80:0001:1:0: MNWNNTNNS | I0001303 | 139, -445 | | — | — | Windows 2000 | OS_Win2000 |
| T8000:80BC:8154: 05B4:0:40:0001:1:1: MNWNNT | I000I7913 | — | 137 | — | — | OS X | OS_MAC |
| T2000:2000:2000: 05B4:0:40:0001:0:0: MNW | I00137993 | — | — | — | — | Xerox Phaser 7300 | OS_PRINTER |
| T4000:4100:4080: 05B4:4:40:0001:1:1: MNWNNT | I0013793 | — | — | — | 161: BIG/ip | FreeBSD | OS_BSD |

SYSTEM AND METHOD OF OPERATING SYSTEM IDENTIFICATION

BACKGROUND OF THE INVENTION

1. Field of the Invention

Embodiments of the invention relate to automated identification of operating systems run by nodes on a computer network.

2. Description of the Related Art

Computer networks, such as the Internet, Intranets, Local Area Networks ("LANs"), Wide Area Networks ("WANs"), and the like, often comprise a large number of network nodes running a variety of operating systems. "Network nodes," or "nodes," as used herein, are broad terms encompassing any electronic device that may be connected to a computer network such that it may receive data, transmit data, or both, over the computer network, and include, for example, desktop computers, laptop computers, server computers, client computers, routers, printers, and the like. These nodes typically execute operating systems, which, as used herein, is a broad term incorporating all operating systems as understood by a skilled artisan and including instructions in hardware, firmware, software, or any combination of the foregoing that control the basic operations of a node upon which the operating system executes.

A number of computer processes, including, for example, network vulnerability detection systems, include processes for identifying an operating system executed by the nodes of a computer network. Such processes for identifying operating systems typically rely on a test for detecting unique attributes of each operating system, such as, for example, a test that transmits certain Transmission Control Protocol ("TCP") packets to a node and detects unique characteristics of TCP packets that the node transmits in response. Conventional operating system identification systems have a number of limitations, including, for example, employing invasive tests that may crash or otherwise harm a tested node, being limited to employing one or two identification tests in combination, and lacking a mechanism that resolves conflicts among competing identification tests. As such, conventional tests are limited in their safety and accuracy. It is anticipated that a skilled artisan will appreciate, in light of this disclosure, other limitations of conventional operating system identification systems.

SUMMARY OF THE INVENTION

Embodiments of the invention include an automated system for performing multiple tests for identifying an operating system executed by a node. In an advantageous embodiment, a combination of multiple tests is run where the tests are calibrated, individually, in combination, or both individually and in combination, to generate an acceptably accurate operating system identification. According to an embodiment, an identification module performs an overall operating system identification based on results of the multiple tests. Advantageously, the identification module may communicate with identification rules that are configured to determine, based on the results of individual tests, which individual test is likely to have provided the most accurate operating system identification, and to rely on the determined most-accurate individual test to make an overall identification. Additionally or alternatively, the identification module may be configured to rely, in some or all circumstances, on a combination of individual tests. According to an embodiment, each of the tests is non-invasive, being configured so as not to cause a crash or other harm to a tested node.

In an embodiment, the multiple tests include a TCP identification test, an Interent Control Message Protocol ("ICMP") identification test, a banner matching test, an open port signature test, and a NULL session enumeration test. According to an embodiment, a logic engine compares results of each test to stored fingerprints, where the stored fingerprints include results expected to occur when the tests are run on nodes executing a specific operating system. One, some, or all of the tests may rely in whole or in part on these identification fingerprints. In one embodiment, the logic engine is a fuzzy logic engine that calculates a closest match between results of a test and the identification fingerprints, such that an identification may be made even when no exact match is found.

In alternative embodiments, a different combination of tests may be used. For example, the TCP identification, ICMP identification, banner matching, and open port signature tests may be combined without using the NULL session enumeration test. TCP identification, ICMP identification, and banner matching may be used in combination. TCP identification, ICMP identification, and open port signature may be used in combination. TCP identification may be used with banner matching, open port signature, or NULL session enumeration, or any combination of the foregoing tests, without using the ICMP identification test. Likewise, ICMP identification may be used with banner matching, open port signature, or NULL session enumeration, or any combination of the foregoing tests, without using the TCP identification test. A skilled artisan will appreciate, in light of this disclosure, that these and many other combinations of the individual tests may be used to identify an operating system that executes on a given network node. Additionally or alternatively, other operating system identification tests not explicitly listed herein, but understood by a skilled artisan in light of this disclosure, may be used in combination with any or all of the foregoing test combinations.

According to an embodiment, the operating system identification system also includes a conflict resolution module that resolves conflicts among the multiple tests, such as, for example, when one test determines that a node executes Windows XP and another test determines that a node executes Unix. As will be appreciated by a skilled artisan in light of this disclosure, the conflict resolution module may advantageously be used any time that at least two individual identification tests are performed, regardless of the identity of the two or more individual tests, and at least two different operating system identifications are made by the individual identification tests. In one advantageous embodiment, the conflict resolution module employs a plurality of conflict resolution definitions that define special cases in which the general identification rules may be overridden to make an identification without regard to the general identification rules. Alternatively or additionally, the conflict resolution module may be configured to work in combination with the general identification rules to make an operating system identification. In an advantageous embodiment, the logic engine performs logical operations, fuzzy or otherwise, to identify a close match between actual test results of the individual tests and expected test results stored in the conflict resolution definitions. In an embodiment, when the conflict resolution module does not find a close match between actual test results and expected test results, the operating system identification system relies on the general identification rules to make an operating system identification.

These and other embodiments of the operating system identification system perform one or more methods of identifying an operating system executed by a network node. In one embodiment of the method, multiple operating system identification tests are performed, each identification test making an individual identification of the operating system executed by the node. According to one embodiment, the multiple operating system identification tests include a TCP identification test, an ICMP identification test, a banner matching test, an open port signature test, and a NULL session enumeration test. In alternative embodiments, one or more of these tests may be excluded, such that a subset of the foregoing tests may be performed in any combination. Alternatively, a subset or all of these tests may be performed in combination with additional operating system identification tests known to a skilled artisan. Based on the multiple operating system identification tests, an overall operating system identification may be performed. In one embodiment, the overall operating system identification is performed by matching actual results from the tests with identification fingerprints and determining, based on identification rules, a test upon which to rely. In one embodiment, any conflicts among the multiple tests may be resolved using a conflict resolution module. The conflict resolution module, in one embodiment, relies on conflict resolution definitions instead of the general identification rules to make an operating system identification.

The foregoing and other features of the various embodiments result in embodiments of an operating system identification system with increased safety and accuracy. These and other advantages that will be appreciated by a skilled artisan in light of this disclosure are provided in varying degree by various embodiments of the system described herein. A skilled artisan will appreciate, in light of this disclosure, that multiple embodiments are described herein, that have different components, features, and advantages. A skilled artisan will appreciate, in light of this disclosure, that an operating system identification system or method need not have every component, feature, and advantage described herein to be encompassed by the invention of this disclosure. Additionally, a skilled artisan will appreciate, in light of this disclosure, that the embodiments described herein are exemplary only and not limiting. It is anticipated that a skilled artisan, in light of this disclosure, will appreciate how to make, use, and practice many alternative embodiments of the invention in addition to the exemplary embodiments disclosed herein. All such embodiments are intended to be within the scope of this disclosure.

BRIEF DESCRIPTION OF THE DRAWINGS

FIG. 4 is a table illustrating exemplary conflict resolution definitions that may be employed by the operating system identification system of FIG. 1 to resolve conflicts among results in operating system identification tests.

DETAILED DESCRIPTION OF THE PREFERRED EMBODIMENT

Figure 1:
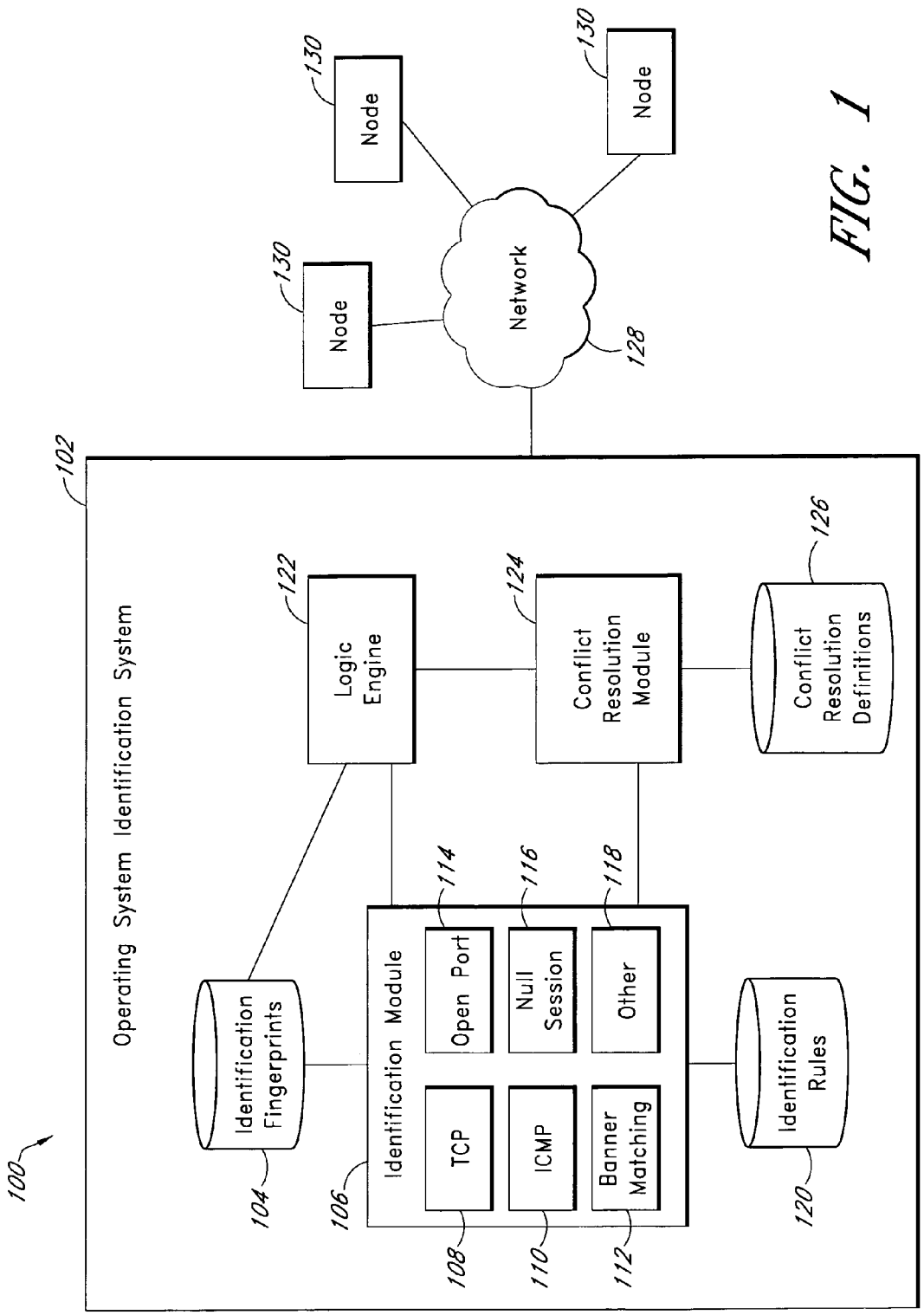
FIG. 1 is a block diagram of an exemplary embodiment of an operating system identification system.

In a number of automated processes, identifying an operating system that is executed by a network node on a computer network can be useful. For example, a network vulnerability detection system may be tailored such that it focuses specific tests for detecting network vulnerabilities that are known to occur on network nodes running particular operating systems. Because many network vulnerabilities are operating system specific, identifying nodes on a network by the operating system that they run advantageously allows a network vulnerability detection system to more effectively and efficiently scan a computer network for security vulnerabilities. A general description of a network vulnerability detection system is found in currently co-pending and commonly assigned U.S. patent application Ser. No. 10/050,675, titled "System and Method for Network Vulnerability Detection and Reporting" which was filed on Jan. 15, 2002, and which is incorporated by reference herein in its entirety. A skilled artisan will appreciate, in light of this disclosure, that embodiments of the operating system identification system described herein may advantageously be used in combination with the network vulnerability detection system of the foregoing patent application, or of any other vulnerability detection system, to provide for the identification of operating systems run by network nodes. A skilled artisan will also appreciate, however, that embodiments of the operating system identification system described herein may be used in any number of automated processes, and that this disclosure intends to cover any use of the system and method described herein without regard to the context of any larger system in which they are used.

Advantageously, embodiments of the methods and systems described herein provide for safer and more accurate identification of operating systems executed by network nodes than has heretofore been provided by conventional operating system identification systems. Specifically, embodiments of the systems and methods described herein provide multiple operating system identification tests and identification rules for determining which of the multiple operating system identification tests is likely to be most accurate under given circumstances. Additionally, embodiments of the systems and methods provide a conflict resolution module that identifies, for certain special cases in which the results of the individual tests conflict, an overall identification of the operating system executed by a particular network node.

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

FIG. 1 is a block diagram of an exemplary embodiment of an operating system identification system 102. According to an embodiment, the operating system identification system 102 comprises a plurality of identification fingerprints 104, an identification module 106, a plurality of identification rules 120, a logic engine 122, a conflict resolution module 124, and a plurality of conflict resolution definitions 126. In one embodiment, the identification module 106 generally comprises computer executable code configured to manage the identification of an operating system that is executed by a node on a computer network. In general, the computer executable code includes software instructions organized into a number of functions, routines, subroutines, procedures, objects, methods, data structures, and other mechanisms for computer software organization that will be recognized by a skilled artisan in light of this disclosure. Additionally or alternatively, a skilled artisan will appreciate that hardware-based or firmware-based computer executable instructions, or hardware circuitry generally can be made to be interchangeable with and interoperable with computer executable code, and that the identification module 106 may be implemented using a combination of software, hardware, or firmware, as will be understood by a skilled artisan in light of this disclosure.

The identification fingerprints 104, the identification rules 120 and the conflict resolution definitions 126 are advantageously stored in respective databases. Alternatively, two or more of the sets of fingerprints and rules may be stored in a combined database. Alternatively, the identification fingerprints 104, the identification rules 120, and the conflict resolution definitions 126 may be stored in text files, may be stored in a file of a different format, or may be hard-coded into computer executable code. A skilled artisan will appreciate, in light of this disclosure, that any combination of the foregoing ways of storing the identification fingerprints 104, the identification rules 120, and the conflict resolution definitions 126 may be employed, including, for example, an embodiment in which the identification fingerprints 104 are stored in a database, the identification rules 120 are hard-coded into computer executable code, and the conflict resolution definitions 126 are stored in text files. Additionally, each of the identification fingerprints 104, the identification rules 120, and the conflict resolution definitions 126 may be partially or wholly stored in more than one format. As discussed below, the fingerprints and rules are accessible for communication with other elements of the operating system identification system 102.

In one embodiment, the identification module 106 comprises a plurality of operating system identification tests, including, for example, a TCP identification test 108, an ICMP identification test 110, a banner matching test 112, an open port signature test 114, and a NULL session enumeration test 116. Additionally, a skilled artisan will appreciate, in light of this disclosure, that the identification module 106 may include one or more other identification tests 118. As with the identification module 106, each of the foregoing operating system identification tests, in one embodiment, comprise software, hardware, or firmware computer executable code or circuits, or some combination of the foregoing. In one embodiment, the operating system identification tests are configured to perform defined tasks for identifying operating systems on a network node. According to an embodiment, the identification module is 106 in communication with the identification fingerprints 104, the identification rules 120, the logic engine 122, and the conflict resolution definitions 126; hence, each operating system identification test is in communication with the identification fingerprints 104, the identification rules 120, the logic engine 122, and the conflict resolution definitions 126. Additionally, the operating system identification system 102 is in communication with a network 128 which in turn communicates with a plurality of network nodes 130.

A general description of the operation of one embodiment of the operating system identification system 102 follows. As will be appreciated, although each individual identification test generally includes the characteristics described in this general description, each individual identification test may depart from this general description. As such, this general description is intended for ease of understanding of embodiments of the invention generally and is not intended to limit each individual identification test. Individual characteristics of embodiments of the identification tests are later described herein.

According to an embodiment, the identification module 106 performs multiple operating system identification tests. Generally, in one embodiment, the operating system identification system 102 performs the tests on each of a plurality of nodes 130 on a network 128. Thus, while the tests herein are described, for ease of understanding, as being performed on one node 130, the tests are generally repeated multiple times. In general, each of the multiple tests performed by the identification module 106 causes the operating system identification system 102 to transmit one or more packets to the node 130 that is to be tested. In one embodiment, the transmitted packets are configured to invoke a measurable response from the tested node 130, such as, for example, one or more response packets. In one embodiment, each test receives a response from the tested node 130. Advantageously, the identification module 106 may compare the response or characteristics of the response with one or more identification fingerprints 104. The identification module 106 may reorganize, rearrange, or reformat the response, or the identification fingerprints 104 for ease of comparison.

In one embodiment, the identification fingerprints 104 comprise data stored as strings or other data structures that represent characteristics of responses that are expected to be generated by specific operating systems. By matching an actual response received from the node 130 with an identical or similar identification fingerprint 104, each identification test is able to make an identification of an operating system executed by the tested node 130. As each identification test may cause the tested node's 130 response to be in a different format, advantageously the identification fingerprints 104 include fingerprints that are particularly formatted for each identification test. In one embodiment, the identification fingerprints 104 are stored as a number of records in a database. Additionally or alternatively, the identification fingerprints 104 may be stored as strings in a text file, or fields in an array, a linked list, or the like. A skilled artisan will appreciate, in light of this disclosure, that the identification fingerprints 104 may be stored in any number of formats and data structures known to a skilled artisan, and all such mechanisms for storing the identification fingerprints 104 are within the scope of this disclosure. While the identification fingerprints 104 are depicted graphically as being stored in a single location, a skilled artisan will appreciate, in light of this disclosure, that the identification fingerprints 104 may be stored in multiple locations, either on a single computer or storage device, or distributed over several computers or storage devices.

According to an advantageous embodiment, the identification fingerprints 104 or the conflict resolution definitions 126 or both are defined based on empirical results obtained from known operating systems. Such empirical results may be collected by human observation, such as, for example, by a human user identifying a known operating system, running one or more operating system identification tests, and recording empirical results from the tests. Additionally or alternatively, such empirical information may be collected by automated processes configured to run one or more operating system identification tests on nodes running known operating systems and configured to record the results. Advantageously, providing databases or other stores of accurate empirical data enhances the accuracy of operating system identification performed by embodiments of the operating system identification system 102 disclosed herein.

According to an embodiment, the logic engine 122 matches the actual responses received by each of the identification tests with the identification fingerprints 104 to assist the identification module 106 to make an identification of the operating system running on the tested node 130. In one embodiment, matching performed by the logic engine 122 need not be exact. Indeed, in one embodiment, the logic engine 122 is a fuzzy logic engine, configured to find a closest match when no exact match is found. According to an embodiment, the logic engine 122 is further configured to calculate a confidence level that expresses a degree to which the identification of the operating system is deemed to be accurate. In one embodiment, the confidence level is expressed in percentage terms. A skilled artisan will appreciate that any scale may be used, such as, for example, a five-point scale, a ten-point scale, a twenty-point scale, or the like. In one embodiment employing a percentage-based confidence level, an identification of Windows XP with a 95% confidence level indicates that the logic engine 122 has determined that there is a 95% probability that the operating system running on the tested node 130 is, in fact, Windows XP. A skilled artisan will appreciate, in light of this disclosure, that a number of methods exist for calculating a confidence level. In one embodiment, a standard linear algebra fitness calculation, as will be understood by a skilled artisan, is used to calculate a confidence level. Alternatively or additionally, a confidence level may be assigned, rather than being calculated. For example, in some embodiments of the individual identification tests, a confidence level may be stored in association with the identification fingerprints 104, as is later described in more detail herein. As with the identification module 106, in one embodiment the logic engine 122, comprises software, hardware, or firmware computer executable code or circuits, or some combination of the foregoing.

As indicated, in one embodiment, each identification test makes an identification of the operating system running on the tested node 130 and calculates or assigns a confidence level representing a degree to which the identification is deemed to be accurate. Because multiple tests are run, multiple identifications and multiple confidence levels may be generated. In some cases, the identifications may be different. In one embodiment, the results of each test are independent of the results of the other tests, in that the results of one test do not influence the results of another test. Alternatively, the results of one or more of the tests may be at least partially dependent on the results of one or more of the other tests. In one embodiment, the identification module 106 makes an overall identification based on the individual identifications and confidence levels. In one embodiment, the identification module's overall identification is driven by the identification rules 120. According to an embodiment, the identification rules 120 comprise data stored in database records, text files, any other data structure, or hard-coded into computer-executable instructions. In one embodiment, the identification rules 120 include a rule that directs the identification module 106 to make an overall identification that matches the identification that has the highest confidence level and is thus deemed to be the most reliable. In one embodiment, the identification rules 120 include rules that define an order of precedence for the individual tests, such that, for example, results from the TCP identification test are preferred over results from the ICMP identification test. A skilled artisan will appreciate that many other types of rules may be implemented within the identification rules 120, and that the foregoing rules and any additional rules may be combined to produce more complex rules.

For example, the identification rules 120 may include a rule that relies both on an order-of-precedence and the confidence level, such as, for example, by choosing the results of the TCP identification test over the results of the ICMP identification test, but only if the TCP identification test has a confidence level of at least 90%.

As indicated, a skilled artisan will appreciate in light of this disclosure that a great number of identification rules 120 may be defined. In one advantageous embodiment, the identification rules 120 direct the identification module 106 to make an identification based on the algorithm that follows this paragraph. Advantageously, executing these rules in the order presented produces operating system identifications that are highly accurate. A skilled artisan will appreciate, however, that embodiments that include modifications to these rules, while not necessarily resulting in the most advantageous embodiments, nevertheless are useful for identifying an operating system and are within the scope of the invention.

1. A series of tests are performed, including TCP identification, ICMP identification, banner matching, an open port signature test, and a NULL session enumeration test. (Details concerning embodiments of these tests are described below.)

2. The TCP identification is initially deemed to be the most correct.

3. If the TCP identification confidence level is less than 90%, the ICMP identification is considered. If the ICMP identification confidence level is higher than the TCP identification confidence level, the ICMP identification is deemed to be most correct.

4. If the banner matching confidence level is higher than the confidence level of the test that currently is deemed to be most correct, the banner matching identification is now deemed to be most correct.

5. If the TCP open port signature test confidence level is higher than the confidence level of the test that currently is deemed to be most correct, and the TCP open port signature test confidence level is higher than 60%, the TCP open port signature test is now deemed to be most correct.

6. If the User Datagram Protocol ("UDP") open port signature test confidence level is higher than the confidence level of the test that currently is deemed to be most correct, and the UDP open port signature test confidence level is higher than 60%, the UDP open port signature test is now deemed to be most correct.

7. If the NULL session enumeration test confidence level is higher than the confidence level of the test that currently is deemed to be most correct, the NULL session enumeration test is now deemed to be most correct.

8. The identification module 106 makes an overall identification that matches the identification made by the test that is deemed to be most correct.

As indicated, the foregoing identification rules 120 assist the identification module 106 to make an accurate identification of the operating system being run by the tested node 130. In some special cases, however, the identification module 106 has difficulty making an accurate identification by relying solely on the individual tests and the identification rules 120. As such, in one embodiment the operating system identification system 102 further includes conflict resolution definitions 126 configured to recognize such special cases and to make a finer and more accurate identification. In one embodiment, the conflict resolution module 124 recognizes special cases that trigger special handling by the conflict resolution module 124 by referring to information maintained within the conflict resolution definitions 126. In one embodiment, each conflict resolution definition 126 generally comprises a plurality of identification fingerprints (e.g.) fingerprints that are like the identification fingerprints 104 and an associated operating system. One embodiment of the conflict resolution definitions 126 is later described in greater detail with reference to FIG. 4. In one embodiment, by comparing actual results obtained from some or all of the individual tests with one or more of the conflict resolution definitions 126, the conflict resolution module 124 matches, wholly or partially, the actual results with one of the conflict resolution definitions 126. In one embodiment, the logic engine 122 assists the conflict resolution module 124 to make such matches. Advantageously, the logic engine 122 may be a fuzzy logic engine and may make inexact matches.

According to an embodiment, if the conflict resolution module 124, in cooperation with the logic engine 122, matches actual test results with one of the conflict resolution definitions 126, the identification module 106 makes an overall identification that matches the operating system associated with the matched conflict resolution definition 126. Alternatively, the identification module 106 may rely on the conflict resolution module 124 when such a match occurs in some circumstances but not in others. For example, the identification module 106 may rely on the conflict resolution module 124 if none of the individual tests has a confidence level greater than 95%, but may rely on the high-confidence test otherwise. A skilled artisan will appreciate that many variations are possible without departing from the scope of the invention. Advantageously, embodiments of the conflict resolution module 124 provide, in addition to the already-layered identification rules 120, another layer for identifying an operating system of a network node 130. A skilled artisan will appreciate, in light of this disclosure, that providing such a layered approach increases the accuracy of operating system identifications made by the operating system identification system 102, in addition to providing other advantages that will be recognized by a skilled artisan in light of this disclosure.

Having described embodiments of the operating system identification system 102 generally, exemplary implementations of the TCP identification test 108, the ICMP identification test 110, the banner matching test 112, the open port signature test 114, and the NULL session enumeration test 116 are now described in more detail. This description is included to fully describe advantageous embodiments but not to limit the invention. A skilled artisan will appreciate, in light of this disclosure, that many of the details described herein can be modified without departing from the principles of the invention. Such modifications are encompassed within the scope of the invention. Furthermore, it is anticipated that a skilled artisan will appreciate, in light of this disclosure, how to make, use, and practice embodiments of the invention that incorporate modifications not explicitly described herein.

One Embodiment of a TCP Identification Test

According to an embodiment, the TCP identification test 108 operates as follows:

1. The test 108 transmits a TCP synchronous control flag ("SYN") packet to the tested node 130.

2. The test 108 receives a SYN acknowledgment packet ("SYN ACK") that is transmitted by the tested node 130 in response to the TCP SYN packet. Based on data included within the SYN ACK packet, the test 108 records the TCP advertised window, the Maximum Segment Size ("MSS"), the Time to Live ("TTL"), the Don't Fragment ("DF") bit, and the IP Header packet ID number, or packet serial number.

3. The test 108 transmits a second TCP SYN packet with the MSS TCP option set to 320, TCP Timestamp, Selective Acknowledgement ("SACK"), Window Scale ("WS"), and Timestamp options.

4. The test 108 receives a second SYN ACK. The test 108 records the TCP advertised window, the MSS, the WS option, the IP ID value, and miscellaneous TCP options.

5. The test 108 transmits a third TCP SYN packet with the MSS TCP option set to 384, Timestamp options, a WS value, a SACK, and the IP ID value.

6. The test 108 receives a third SYN ACK. The test 108 records the TCP advertised window, the MSS, and miscellaneous TCP options.

Advantageously, recording the information received from the node 130, as indicated above, allows the identification module 106 to construct a TCP fingerprint that can be used by the TCP identification test 108 to accurately identify the operating system running on the node 130. In an advantageous embodiment, the TCP SYN packets are RFC-compliant, meaning that they comply with the standard for TCP packets defined by the TCP specification contained in Request for Comments 793 ("RFC 793"), a specification originally published by the Defense Advanced Research Projects Agency in September 1981. RFC 793 is hereby incorporated by reference in its entirety. Advantageously, transmitting RFC-compliant TCP SYN packets enhances the safety of the TCP identification test 108 by minimizing the chance that receipt of the TCP SYN packets will cause any of the network nodes 130 to crash.

In one embodiment, the information received from the network node 130 is matched against TCP fingerprints stored in the identification fingerprints 104. In one embodiment, the TCP fingerprints have the following format:

Twin1:Win2:Win3:MSS:WS:TTL:Idents:DF:TS:Options, OS Name, OS category where

T indicates that this is a TCP fingerprint;

Win1 is the TCP advertised window of the first TCP SYN packet;

Win2 is the TCP advertised window of the second TCP SYN packet;

Win3 is the TCP advertised window of the third TCP SYN packet;

MSS is the value of the Maximum Segment Size ("MSS") TCP option, which in one embodiment is recorded from the first packet;

WS is the value of the window scale option, which in one embodiment is recorded from the second packet;

TTL is the value of the Internet Protocol Time to Live ("TTL") field, which in one embodiment is recorded from the first packet;

Idents is the greatest common divisor of the differences between IP ID values received from all 3 TCP responses;

DF is the value of the Don't Fragment bit, which in one embodiment is recorded from the first packet;

TS is the value of the TCP timestamp option, which in one embodiment is recorded from the second packet;

Options indicates the type of TCP options that appear, in one embodiment, in the first and second TCP SYN packets;

OS Name is a descriptive name indicating which operating system is associated with the fingerprint; and OS category is a code used by the operating system identification system 102 to categorize the operating system associated with the fingerprint.

According to an embodiment, an exemplary TCP fingerprint associated with the OpenBSD operating system is "T4000:4058:4164:0578:0:40:0001:1:1:MNNSNWNNT", "OpenBSD", OS_BSD. The meaning of the letters representing TCP options follows. "M" refers to TCP Maximum Segment Size, "N" refers to No Operation ("NOP"), "S" refers to SACK enabled, "W" refers to Window Scale Factor, and "T" refers to Timestamp.

As indicated, in one embodiment, three different TCP SYN packets are transmitted to the tested node 130. The following tables define the three TCP SYN packets that are sent according to one embodiment:

Packet 1:

| | |
|---|---|
| Source port | Random |
| Destination port | Specified |
| Sequence number | Random |
| Header length | 20 |
| Flags | SYN |
| Window Size | 16384 |
| Checksum | Calculated |

Packet 2:

| | |
|---|---|
| Source port | Random |
| Destination port | Specified |
| Sequence number | Random |
| Header length | 48 |
| Flags | SYN |
| Window Size | 16384 |
| Checksum | Calculated |
| Options | MSS: 320, Timestamp: 4157683519, NOP, NOP, WS: 10, NOP, SACK, NOP, NOP, End of Line ("EOL") |

Packet 3:

| | |
|---|---|
| Source port | Random |
| Destination port | Specified |
| Sequence number | Random |
| Header length | 48 |
| Flags | SYN |
| Window Size | 16384 |
| Checksum | Calculated |
| Options | MSS: 384, Timestamp: 4157683519, NOP, NOP, WS: 10, NOP, SACK, NOP, NOP, EOL |

According to the foregoing embodiment, the main difference in each packet is the MSS size which is incremented from 0 in the first packet to 320 in the second packet and to 384 in the third packet. Operating systems have been found to respond differently to changes in the MSS size. Recording how a particular node 130 responds to changes in the MSS size increases the accuracy of the TCP identification test 108.

As previously indicated, in one embodiment, fuzzy matching of the TCP fingerprints and results of the TCP identification test 108 may be performed by the logic engine 122, allowing for the generation of a confidence level. In one embodiment, a fitness calculation is used to generate the confidence level. In one embodiment, the following exemplary algorithm for performing a fitness calculation that results in a confidence level is used:

1. The 3-packet information probe is performed.

2. The detected TCP advertised window is compared to each first TCP window stored in the identification fingerprints 104.

3. Based on the comparison, perform this step if the TCP advertised window (TCP-Win) is less than the fingerprint window (F-Win) multiplied by 2:

a. If TCP-Win<=F-Win: Compute the fitness by finding the equation of the line (F-Win, 1) (0, 0) and inputting the value TCP-Win to find the fitness.

b. If TCP-Win>F-Win: Compute the fitness by finding the equation of the line (F-Win*2, 0) (F-Win, 1) and inputting the value TCP-Win to find the fitness.

4. Perform these same linear functions for the three TCP advertised windows, MSS and TCP options.

5. Find the fingerprint that best fits the host in question.

6. Apply a weight to each field and normalize values. In one embodiment, the three TCP advertised windows have the highest weight (normalized to 1.0), followed by WS with a weight of 0.7, the DF bit with a weight of 0.7, the WS option with a weight of 0.25, TCP option ordering with a weight of 0.25, the timestamp value with a weight of 0.2, and MSS with a weight of 0.1.

7. Each probability from each field is summed and averaged, taking into account the applicable weighting. The resulting value is the probability that the host in question is the fingerprint identified. The confidence level is assigned this probability value.

One Embodiment of an ICMP Identification Test

According to an embodiment, the ICMP identification test 110 is performed as follows:

1. The test 110 transmits a UDP packet containing 70 bytes of data to a port that is known to be closed on the tested node 130 and records results received from the node 130. A default closed port is port 1.

2. The test 110 transmits an ICMP Echo Request packet with 64 bytes of data to the tested node 130 and records results received from the node 130.

3. The test 110 transmits an ICMP Timestamp Request packet to the tested node 130 and records results received from the node 130.

4. The test 110 transmits an ICMP Echo Request packet with 64 bytes of data and the Type Of Service "precedence" bit set to the tested node 130 and records results received from the node 130.

5. The test 110 transmits an ICMP Address Mask Request packet to the tested node 130 and records results received from the node 130.

6. The test 110 transmits an ICMP Information Request packet to the tested node 130 and records results received from the node 130.

In one embodiment, any responses received from the tested node 130 are read by the identification module 106, which extracts certain elements from the responses and converts them into a text fingerprint string. In one embodiment, the fingerprint string is a hex number in which each "one" bit represents the presence of a particular aspect in the responses, and each "zero" bit represents the absence of a particular aspect in the responses.

For example, following are some exemplary bits that may be stored in a fingerprint string, together with the meaning of each bit and a test for determining whether or not the bit is set:

For an ICMP port unreachable reply (from the test in step (1), above):

Set a PACKET1_REPLY bit

If the IP header Type Of Service bit is set to zero, set a PACKET1_PREC0 bit

If the IP header Type Of Service bit is set to a particular value INETCONTROL, set a PACKET1_PRECC0 bit If number of returned bytes is 8, set a PACKET1_RET8 bit If number of returned bytes is 64, set a PACKET1_RET64 bit If the contents of the packet contain more than 20 bytes of the original datagram data, set a PACKET1_MORE20 bit If the checksum of the contents of the packet is the same value as calculated at the point of receipt of this packet, set a PACKET1_IPCHECKSUMOK bit If the checksum of the contents of the packet is zero, set a PACKET1_IPCHECKSUM0 bit If the checksum of the UDP data contained within the reply is zero, set a PACKET1_UDPCHECKSUM0 bit If the value of the IP ID section of the packet is the same as which we originally sent, set a PACKET1_IPIDECH0 bit If the packet's TTL value is less than or equal to 32, set a PACKET1_TTL32 bit If the packet's TTL value is less than or equal to 64, set a PACKET1_TTL64 bit If the packet's TTL value is less than or equal to 128, set a PACKET1_TTL128 bit If the contents of the packet contains the DF flag value, set a PACKET1_DFSAME bit For an ICMP echo reply packet (from step (2) above):
Set a PACKET2_REPLY bit
If the IP header IP ID value is zero, set a PACKET2_IPID0 bit For an ICMP timestamp reply packet (from step (3) above):
Set a PACKET3_REPLY bit For an ICMP echo reply packet (from step (4) above):
Set a PACKET4_REPLY bit
If the contained ICMP HEADER Code value is zero, set a PACKET4_CODE0 bit
If the packet has a TTL value of less than or equal to 32, set a PACKET4_TTL32 bit
If the packet has a TTL value of less than or equal to 128, set a PACKET4_TTL128 bit
If the packet has a TOS value of zero, set a PACKET4_TOS bit For an ICMP Address Mask reply packet (from step (5) above):
Set a PACKET5_REPLY bit For an ICMP Information Request reply packet (from step (6) above):
Set a PACKET6_REPLY bit In an advantageous embodiment, the values chosen for PACKET1_REPLY, PACKET2_REPLY are arbitrary but unique values representing a single bit set value. Thus the combination of these values together serve to set individual bits within a final value that is used as the fingerprint definition.

A skilled artisan will appreciate, in light of this disclosure, that alternative bits can be chosen to create a fingerprint string, and that the foregoing exemplary bits and any other bit can be arranged in any order. The invention is not limited to a particular choice of bits and/or bit orderings for inclusion in the fingerprint strings.

Advantageously, recording the information received from the node 130, as indicated above, allows the identification module 106 to construct an ICMP fingerprint that can be used by the ICMP identification test 110 to accurately identify the operating system running on the node 130. In one embodiment, the information is matched against ICMP fingerprints stored in the identification fingerprints 104. In one embodiment, the ICMP fingerprints have a format as illustrated by the following example fingerprint:

"I0026620B", "HP-UX", UNIX where

I indicates that this is an ICMP fingerprint;

B is the hex fingerprint information;

HP-UX is a text description indicating an operating system associated with this fingerprint; and UNIX is a code used by the operating system identification system 102 to categorize the operating system associated with the fingerprint.

The following tables define in more detail exemplary packets transmitted by the ICMP identification test 110 according to one embodiment:

| UDP Packet: | |
| --- | --- |
| Source port | Random |
| Destination port | 1 |
| Length | 78 |
| Checksum | Calculated |
| Data | 70 bytes of 0xab |
| First ICMP Packet (Echo Request): | |
| Type | 8 |
| Code | 0 |
| Checksum | Calculated |
| Identifier | Random |
| Data | 64 bytes of 0xcd |
| Second ICMP Packet (Timestamp Request): | |
| Type | 13 |
| Code | 0 |
| Checksum | Calculated |
| Identifier | Random |
| Sequence number | Calculated Sequential |
| Originate timestamp | 3452816845 |
| Receive timestamp | 3452816845 |
| Transmit timestamp | 3452816845 |
| Third ICMP Packet (Echo Request): | |
| Type | 8 |
| Code | 1 |
| Checksum | Calculated |
| Identifier | Random |
| Sequence number | Calculated Sequential |
| Data | 64 bytes of 0xcd |
| Fourth ICMP Packet (Address Mask Request): | |
| Type | 17 |
| Code | 0 |
| Checksum | Calculated |
| Identifier | Random |
| Sequence number | Calculated Sequential |
| Address mask | 0xcdcdcdcd |
| Fifth ICMP Packet (Information Request): | |
| Type | 15 |
| Code | 0 |
| Checksum | Calculated |
| Identifier | Random |
| Sequence number | Calculated Sequential |

One Embodiment of a Banner Matching Test

According to an embodiment, the banner matching test 112 connects to each open port on the tested node 130 and transmits data to the port that is configured to cause the node 130 to respond by transmitting a banner. For instance, if the port is deemed to be a web server, the string HEAD/HTTP/1.0 is sent to the server in an attempt to cause the node 130 to return a banner containing the version of the web server. Advantageously, banner matching may be used to determine not only the operating system of the node 130, but the actual application and use of the particular device in the context of the operating system. Additionally, banner matching may correctly identify an operating system that would not typically be identifiable by the TCP identification test 108. For example, many network printers use a similar if not identical TCP/IP stack. Thus, banner matching may provide information for differentiating one printer from another. In one embodiment, banner matching is performed on open TCP ports and also on open UDP ports. Alternatively, banner matching may be performed only on open TCP ports or only on open UDP ports but not on both.

As with the other identification tests, the banner matching test 112 includes matching data received in banners with banner fingerprints stored in the identification fingerprints 104. In particular, in one embodiment, matching a received banner with a banner fingerprint includes detecting any substrings within the banner that are stored as part of the banner fingerprints within the identification fingerprints 104. In one embodiment, a fingerprint can include a flag, such as, for example a "!" that precedes the banner text, indicating whether the banner fingerprint is case-sensitive. If the banner fingerprint is case-sensitive, a banner sub-string must have the same characters and same capitalization to match the banner fingerprint. In one embodiment, each banner fingerprint includes an assigned confidence level, or weight, such that, if that particular fingerprint is matched, the associated operating system is likely to be the operating system of the tested node 130 according to the specified confidence level. In one embodiment, banner fingerprints have the following format:

"B:Protocol:Port: Weight", Banner, OS name, OS category
where
B indicates that this is a banner fingerprint;
Protocol is the protocol used for retrieving the banner, which may be UDP or TCP;
Port is the port from which the banner was transmitted from the node 130;
Weight is the confidence level assigned to a match of this banner;
Banner is a string of the actual banner received from the node 130;
OS name is a description of the operating system associated with this fingerprint; and
OS category is a code used by the operating system identification system 102 to categorize the operating system associated with the fingerprint.

According to the foregoing format, following are a number of exemplary banner fingerprints:

"B:UDP:161:100%", "SA VINNetwork Printer", "SA VIN-Network Printer", UNKNOWN

"B:TCP:21:95%", "Digital UNIXVersion", "Digital UNIX", UNIX

"B:TCP:80:100%", "Server: Microsoft-IIS/2.0", "Windows NT 4.0", OS_WINNT

One Embodiment of an Open Port Signature Test

According to an embodiment, the open port signature test 114 identifies an operating system of the tested node 130 with reference to a list of ports that are open on the tested node 130. In one embodiment, the open port signature test 114 does not generate the list of open ports but relies on a list of open ports that has already been generated and is accessible to the identification module 106. Additionally or alternatively, the open port signature test 114 can be configured such that it does generate a list of open ports. Based on a typical installation, each operating system has a set of default ports that are left open. For example, a machine with ports 21, 22, 23, 25, 79, 80, 111 open is usually a UNIX-based operating system. In one embodiment, both an open TCP port signature and an open UDP port signature are recorded, and both types of open port signatures are stored in the identification fingerprints 104. Alternatively, only open TCP port signatures may be recorded or only open UDP port signatures may be recorded. In one embodiment, the identification fingerprints 104 include open port signature fingerprints that define these sets of default ports using the following format:

"P:Protocol:Port list: Weight", OS name, OS category
where
P indicates that this is a open port signature fingerprint;
Protocol indicates the protocol upon which the ports are open, which can be UDP or TCP;
Port list is a list of open ports;
Weight is the confidence level for this fingerprint;
OS name is a description of the operating system associated with this fingerprint; and
OS category is a code used by the operating system identification system 102 to categorize the operating system associated with the fingerprint.

The following are examples of open port signature fingerprints according to the foregoing format:

"P:TCP:1026,1029,1080,1755,3268,3372,3389:80%", "Windows 2000", OS WIN2K

"P:TCP:21,22,23,53,80,111,139,443,1024,1026,6000: 80%", "Linux", OS_LINUX

In one embodiment, the open port signature test 114 is a dependent test that depends on the results of other tests, and that is used not to identify an operating system by itself, but to refine an operating system identification in light of other test results. For example, the open port signature test 114 is particularly useful in distinguishing between certain Microsoft Windows® operating systems. Windows XP and Windows 2000 sometimes can have identical TCP stack fingerprinting, but the operating systems may be distinguishable because Windows XP leaves ports open by default that Windows 2000 does not leave open. Other examples in which two or more different operating systems are distinguishable by a set of default open ports that each operating system leaves open will be known and understood by a skilled artisan in light of this disclosure. A skilled artisan will appreciate, in light of this disclosure, that the open port signature test 114 may increase identification accuracy for these and other cases.

One Embodiment of a NULL Session Enumeration Test

In one embodiment, the NULL session enumeration test 116 functions by taking advantage of NULL sessions as provided by some Windows operating systems on ports providing a Server Message Block service or NETBIOS service. These services are typically located on port 139 and/or port 445. When such NULL session access is provided, the NULL session enumeration test 116 invokes the NetServerGetInfo function to get the Windows ID number, the major version number, and the minor version number. Advantageously, by matching Windows ID number and the major and minor versions to a table of known Windows versions, the NULL session enumeration test 116 is able to identify the exact type of Windows being used when NULL session access is provided.

The following exemplary table shows the matches that are performed in one embodiment:

| ID | Version major | Version minor | Operating System |
|---|---|---|---|
| 400 | 4 | 0 | Windows 9x/ME |
| 500 | 4 | 0 | Windows NT 4.0 |
| 500 | 4 | * | Unix |
| 500 | 5 | 0 | Windows 2000 |
| 500 | 5 | 1 | Windows XP |
| 500 | 5 | 2 | Windows Server 2003 |
| 1280 | * | * | Novell Netware |

Note, with respect to the foregoing table, that asterisks denote a wildcard entry, meaning that any value matches the field with the asterisk. For example, when the Windows ID number is 1280, the table indicates that the operating system is Novell Netware without regard to the major version or the minor version.

Figure 2:
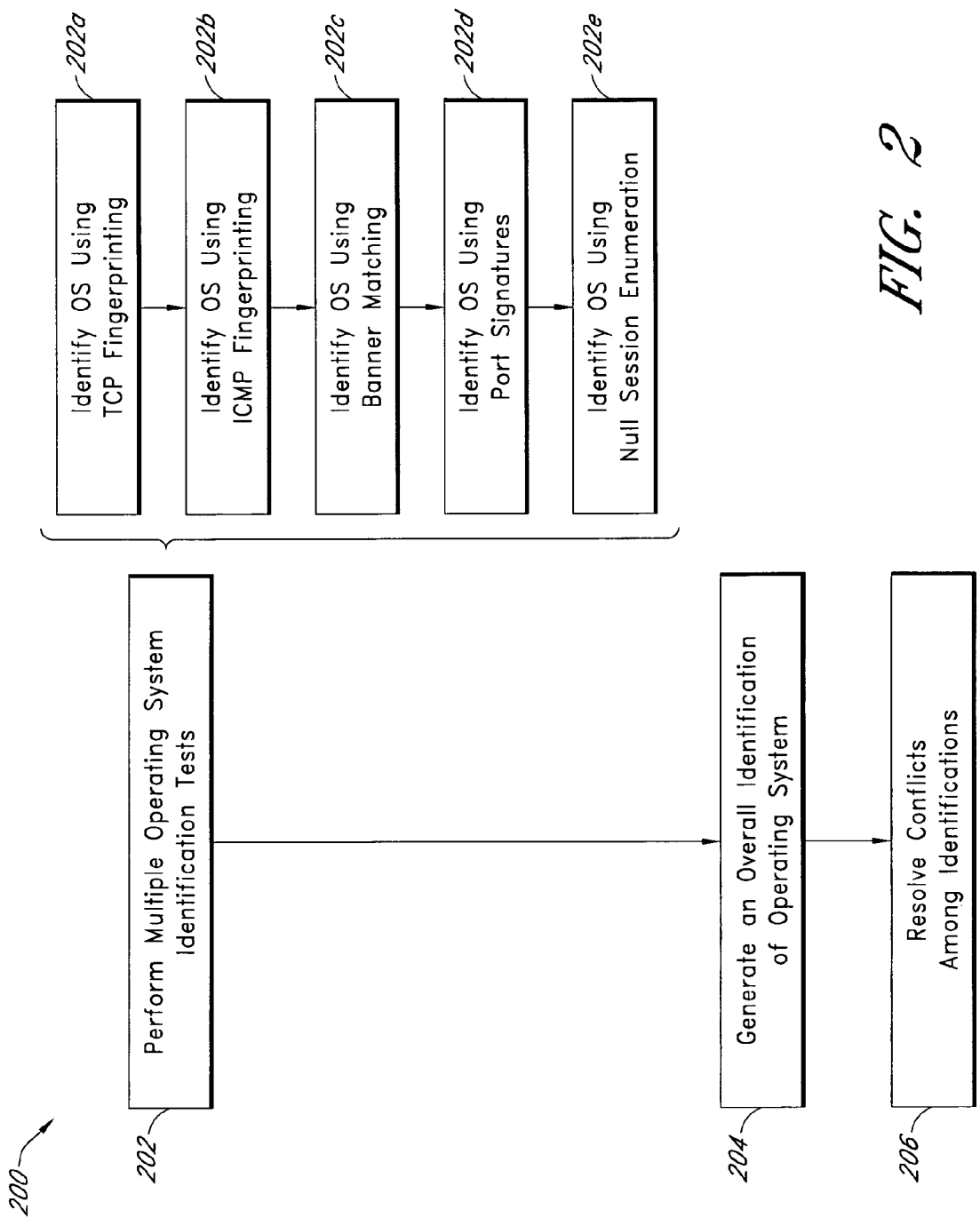
FIG. 2 is a flowchart of an exemplary embodiment of an operating system identification process that may be performed by the operating system identification system of FIG. 1.

FIG. 2 is a flowchart of an exemplary embodiment of an operating system identification process 200 that may be performed by the operating system identification system of FIG. 1. In a block 202, multiple operating system identification tests are performed.

In one embodiment, the identification module 106 performs the multiple tests. As explained in greater detail above with reference to FIG. 1, performance of the multiple operating system identification tests may include, for example, performing a TCP identification test as in a block 202a, performing an ICMP identification test as in a block 202b, performing a banner matching test as in a block 202c, performing an open port signature test as in a block 202d, and performing a NULL session enumeration test as in a block 202e. A skilled artisan will appreciate that a subset of the foregoing tests, or any combination of the foregoing tests along with other identification tests understood by a skilled artisan in light of this disclosure, may be performed within the block 202. In a block 204, an operating system is identified based on results of the multiple tests. In one embodiment, the identification module 106 performs this identification in accordance with the identification rules 120 and the identification fingerprints 104. In an optional block 206, any conflicts among the multiple identification may be resolved. In one embodiment, the conflict resolution module 124 resolves any such conflicts in accordance with the conflict resolution definitions 126.

Figure 3:
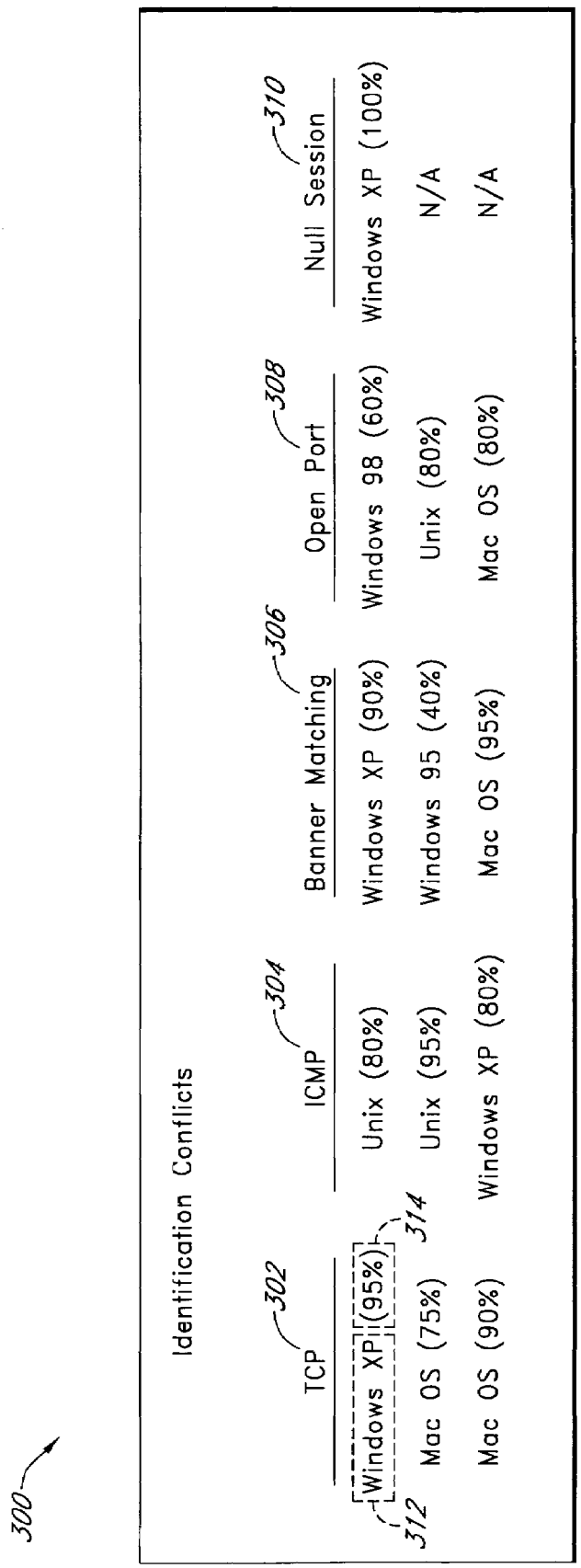
FIG. 3 is a table illustrating conflicts among results of a number of exemplary operating system identification tests that may be performed by the operating system identification system of FIG. 1.

Conflict resolution according to one embodiment will now be described in greater detail with reference to FIGS. 3 and 4. FIG. 3 is a table 300 illustrating conflicts among results of a number of exemplary operating system identification tests that may be performed by the operating system identification system of FIG. 1. As explained above, each identification test that can be run by the identification module 106 generates an operating system identification and a confidence level, where the confidence level comprises an indication of a degree to which the identification is deemed to be accurate. The table 300 illustrates a number of operating system identifications, along with related confidence levels, generated by each of the TCP identification test 108, the ICMP identification test 110, the banner matching test 112, the open port signature test 114, and the NULL session enumeration test 116. As illustrated, a TCP column 302 shows results of the TCP identification test 108, an ICMP column 304 shows results of the ICMP identification test 110, a banner matching column 306 shows results of the banner matching test 112, an open port column 308 shows results of the open port signature test 114, and a NULL session column 310 shows results of the NULL session enumeration test 116. As illustrated in the example, a first TCP operating system identification 312 indicates that the TCP identification test 108 has identified the operating system run by a tested node on the network to be Windows XP. As further illustrated in this example, a first TCP confidence level 314 indicates that the logic engine 122 has calculated the confidence level that the operating system really is Windows XP to be 95%.

The table 300 of FIG. 3 illustrates conflicting identifications provided by the multiple tests. For example, as illustrated in column 304, the ICMP identification test 110 identifies the operating system that the TCP identification test 108 identified as Windows XP to be Unix. As illustrated by this example and as used herein, an identification conflict occurs whenever two or more identification tests generate operating system identifications that disagree with each other. As previously indicated, the identification module 106 is configured to refer to the identification rules 120 to make an overall identification, based on the individual identifications. In some cases, however, special conflict cases may exist for which the identification rules 120 are not guaranteed to direct the identification module 106 to make a correct overall identification. Advantageously, to improve identification accuracy, the conflict resolution module 124 is configured to detect many of these special cases and to intervene to aid the identification module 106 to produce an overall identification that may disagree with the identification that would be generated by following the identification rules 120, but which is deemed to be more accurate than the identification using the identification rules 120. In one embodiment, the conflict resolution module 124 is governed, at least in part, by the conflict resolution definitions 126.

FIG. 4 is a table 400 illustrating exemplary conflict resolution definitions that may be advantageously employed by the operating system identification system of FIG. 1 to resolve conflicts among results in operating system identification tests. As illustrated, in one embodiment, each conflict resolution definition 126 comprises an aggregation of a plurality of identification fingerprints 402-412, including, for example, a TCP fingerprint 402, an ICMP fingerprint 404, a TCP port fingerprint 406, a UDP port fingerprint 408, a TCP port and banner fingerprint 410, and a UDP port and banner fingerprint 412. The conflict resolution definition 126 also comprises an operating system description 414 and an operating system category 416. A skilled artisan will appreciate, in light of this disclosure, that the identification fingerprints 402-412 are similar to the identification fingerprints 104. For example, in the embodiment illustrated, the identification fingerprints 402-412 of the conflict resolution definitions 126 contain all information contained by the identification fingerprints 104 except for an operating system description or an operating system category.

In one embodiment, as part of generating an overall identification, the identification module 106 communicates with the conflict resolution module 124 and passes results from the individual identification tests to the conflict resolution module 124. The conflict resolution module 124 refers to the conflict resolution definitions 126 to determine whether the aggregate results of the individual identification tests match any of the conflict resolution definitions 126. In one embodiment, the conflict resolution module 124 relies on the logic engine 122 to determine whether there is a match. According to an embodiment, a match may be an inexact match, and the logic engine 122 may be configured to use fuzzy logic to detect such an inexact match. Alternatively or additionally, a match may be an exact match. A skilled artisan will appreciate, in light of this disclosure, that many alternative implementations of the logic engine 122 exist, each configured to recognize matches to a different degree of precision. In one embodiment, matching the aggregate test results with the conflict resolution definitions 126 are performed in the same way as the identification module 106 matches individual test results with individual identification fingerprints 104. Indeed, in this embodiment, the similarity between such matching is such that the conflict resolution definitions 126 can be viewed as aggregate fingerprints or as fingerprints of fingerprints.

As illustrated, a number of blanks (illustrated as "—") occur in the table 400. In one embodiment, such blanks are wildcards, meaning that any value matches them. That is, with regard to the second entry in the table 400, a match occurs when there is a match of the TCP fingerprint and the ICMP fingerprint, without regard to any of the other data received from the tested node 130.

If the conflict resolution module 124 finds a match between the aggregate results and the conflict resolution definitions 126, then the identification module 106, in one embodiment, makes an overall identification in accordance with the conflict resolution module 124 instead of in accordance with the identification rules 120. For example, in one embodiment, if actual results match the information contained in the fingerprint columns 402-412, the identified operating system is the associated operating system listed in the operating system description column 414. Alternatively or additionally, when such a match occurs, the identification module 106 may base its overall identification on a combination of the identification rules 120 and the conflict resolution definitions 126. For example, the identification module 106 may rely on the identification rules 120 when an identification with a confidence level greater than 95% is found, but rely on the conflict resolution definitions 126 when an identification without such a high confidence level is found. A skilled artisan will appreciate, in light of this disclosure, that any number of ways to combine the results dictated by the identification rules 120 and the conflict resolution definitions 126 may be employed. Advantageously, providing a conflict resolution module 124 as disclosed herein, in addition to a identification module 106 configured to perform multiple tests, results in increased identification accuracy by accounting for special cases that may otherwise be overlooked by the identification rules 120.

In light of the foregoing, a skilled artisan will appreciate that embodiments of the invention employ a layer-based approach to operating system identification. In one embodiment, multiple layers are employed because the identification module 106 is configured to rely on more than one identification test. Advantageously, each test and specific combinations of tests may be chosen to maximize safety and accuracy of operating system identification. Furthermore, the identification rules 120 may advantageously provide an orderly and accurate way for the identification module 106 to combine the individual identifications from the individual tests into an overall identification. Additionally, in one embodiment, multiple layers are employed because a conflict resolution module 124 is provided that can account for special cases in which overriding or modifying the identification dictated by the identification rules 120 results in a more accurate identification. In light of the foregoing, the layer-based approach and other aspects of embodiments of the invention result in advantages, including, for example, increased safety in operating system identification, increased accuracy in operating system identification, and other advantages that will be appreciated by a skilled artisan in light of this disclosure.

A skilled artisan will appreciate, in light of this disclosure, that not every embodiment described herein, or every alternative embodiment understood by a skilled artisan in light of this disclosure, need achieve every advantage outlined herein.

While this disclosure has focused on certain advantageous embodiments, the invention is not limited only to these advantageous embodiments. Other embodiments may achieve only some of the outlined advantages and be encompassed by the disclosure herein. A skilled artisan will appreciate, in light of this disclosure, how to make, use, and practice the invention according to the embodiments explicitly described herein, according to subsets of those embodiments, according to combinations of those embodiments, and according to additional alternative embodiments not explicitly set forth herein but understood by a skilled artisan in light of this disclosure. All of such embodiments are encompassed by this disclosure. The claims alone, and no other part of this disclosure, define the scope of the invention.

What is claimed is:

1. An operating system identification system including a node capable of executing computer code comprising:
    an identification module configured to execute a plurality of operating system identification tests, each operating system identification test configured to make an identification of an operating system being executed by a network node;
    a plurality of identification rules configured to define a procedure by which the identification module makes an overall identification of the operating system, wherein the overall identification is based at least in part on at least one of the identifications made by the plurality of operating system identification tests; and
    a conflict resolution module configured to detect at least one of a plurality of cases defined by a plurality of conflict resolution definitions in which at least some of the plurality of operating system identification tests disagree in their identification of the operating system, and configured to, upon detecting such a case, to make an identification of the operating system and to cause the identification module to modify the overall identification based at least on the identification made by the conflict resolution module;
    wherein a confidence level is assigned to the identification of the operating system based on a predetermined confidence level stored in association with at least one of a plurality of identification fingerprints used to identify the operating system;
    wherein the identification of the operating system by one of the operating system identification tests is dependent on the identification of the operating system by another one of the operating system identification tests.

2. The operating system identification system of claim 1, wherein the plurality of operating system identification tests includes a Transmission Control Protocol identification test;
    wherein a list of open ports on the network node is generated and, based on the list of open ports, another identification of which operating system is executed by the network node and another confidence level indicating a degree to which the other identification is deemed accurate are generated, wherein making the overall identification of the operating system is further based on the other identification and the other confidence level; and
    wherein generating the list of open ports comprises retrieving a previously constructed list of open ports.

3. The operating system identification system of claim 2, wherein the plurality of operating system identification tests further includes an Internet Control Message Protocol identification test.

4. The operating system identification system of claim 3, wherein the plurality of operating system identification tests further includes a banner matching test.

5. The operating system identification system of claim 4, wherein the plurality of operating system identification tests further includes an open port signature test.

6. The operating system identification system of claim 5, wherein the plurality of operating system identification tests further includes a NULL session enumeration test.

7. The operating system identification system of claim 4, wherein each identification fingerprint is configured to associate an operating system with responses expected to be generated by the associated operating system in response to execution of one of the identification tests, wherein the identification made by each identification test is based, at least in part, on comparisons between the identification fingerprints and actual responses generated by a tested operating system in response to execution of one of the identification tests.

8. The operating system identification system of claim 7, further comprising a logic engine, wherein the logic engine performs the comparisons between the identification fingerprints and actual responses.

9. The operating system identification system of claim 8, wherein at least one of the comparisons performed by the logic engine is a fuzzy logic comparison.

10. The operating system identification system of claim 4, wherein each identification of the operating system made by one of the identification tests is associated with the confidence level indicating a degree to which the identification is deemed to be accurate, and wherein the overall identification is further based on the confidence level associated with the at least one identification relied upon to make the overall identification.

11. The operating system identification system of claim 10, wherein each associated confidence level represents a probability that the identification is accurate.

12. The operating system identification system of claim 1, wherein each operating system identification test executed by the identification module causes a first plurality of packets to be transmitted to the network node and a plurality of response packets to be received by each operating system identification test.

13. The operating system identification system of claim 12, wherein the plurality of response packets are reformatted for use in identifying the operating system being executed by the network node.

14. The operating system identification system of claim 1, further comprising resolving conflicts among the at least one of the identifications made by the plurality of operating system identification tests only if none of the at least one of the identifications is associated with the confidence level greater than the predetermined confidence level.

15. The operating system identification system of claim 14, wherein the resolving conflicts is based at least in part on comparing aggregated results from at least two of the plurality of operating system identification tests with a plurality of conflict resolution definitions.

16. An operating system identification system including a node capable of executing computer code comprising:
an identification module configured to execute a plurality of operating system identification tests including at least a Transmission Control Protocol identification test, an Internet Control Message Protocol identification test, and a banner matching test, each operating system identification test configured to make an identification of an operating system being executed by a network node; and
a plurality of identification rules configured to define a procedure by which the identification module makes an overall identification of the operating system, wherein the overall identification is based at least on at least one of the identifications made by the plurality of operating system identification tests;
wherein a confidence level is assigned to the identification of the operating system based on a predetermined confidence level stored in association with at least one of a plurality of identification fingerprints used to identify the operating system;
wherein the identification of the operating system by one of the operating system identification tests is dependent on the identification of the operating system by another one of the operating system identification tests;
wherein a list of open ports on the network node is generated and, based on the list of open ports, another identification of which operating system is executed by the network node and another confidence level indicating a degree to which the other identification is deemed accurate are generated, wherein making the overall identification of the operating system is further based on the other identification and the other confidence level; and
wherein generating the list of open ports comprises retrieving a previously constructed list of open ports.

17. The operating system identification system of claim 16, wherein the plurality of operating system identification tests further includes an open port signature test.

18. The operating system identification system of claim 17, wherein the plurality of operating system identification tests further includes a NULL session enumeration test.

19. The operating system identification system of claim 16, wherein each identification fingerprint is configured to associate an operating system with responses expected to be generated by the associated operating system in response to execution of one of the identification tests, wherein the identification made by each identification test is based, at least in part, on comparisons between the identification fingerprints and actual responses generated by a tested operating system in response to execution of one of the identification tests.

20. The operating system identification system of claim 19, further comprising a logic engine, wherein the logic engine performs the comparisons between the identification fingerprints and the actual responses.

21. The operating system identification system of claim 20, wherein at least one of the comparisons performed by the logic engine is a fuzzy logic comparison.

22. The operating system identification system of claim 16, wherein each identification of the operating system made by one of the identification tests is associated with the confidence level indicating a degree to which the identification is deemed accurate, and wherein the overall identification is further based on the confidence level associated with the at least one identification relied upon to make the overall identification.

23. The operating system identification system of claim 22, wherein each associated confidence level represents a probability that the identification is accurate.

24. A method of identifying an operating system executed by a network node, comprising:
transmitting a first plurality of Transmission Control Protocol packets to a network node on a computer network, receiving in response a second plurality of Transmission Control Protocol packets, and generating, based on characteristics of the second plurality of Transmission Control Protocol packets, a first identification of which operating system is executed by the network node and a first confidence level indicating a degree to which the first identification is deemed accurate;

transmitting at least a first plurality of Internet Control Message Protocol packets to the network node, receiving in response at least a second plurality of Internet Control Message Protocol packets, and generating, based at least on characteristics of the second plurality of Internet Control Message Protocol packets, a second identification of which operating system is executed by the network node and a second confidence level indicating a degree to which the second identification is deemed accurate;

connecting to at least one open port on the network node, transmitting to the at least one open port data configured to cause the at least one open port to return at least one banner, and generating, based on the at least one banner, a third identification of which operating system is executed by the network node and a third confidence level indicating a degree to which the third identification is deemed accurate; and generating an overall identification, based on at least the first identification, the first confidence level, the second identification, the second confidence level, the third identification, and the third confidence level, of the operating system executed by the network node;

wherein the first confidence level is assigned to the first identification of the operating system the second confidence level is assigned to the second identification of the operating system, and the third confidence level is assigned to the third identification of the operating system based on a predetermined confidence level stored in association with at least one of a plurality of identification fingerprints used to identify the operating system;

wherein the first identification of the operating system, the second identification of the operating system, and the third identification of the operating system by one of a plurality of operating system identification tests are dependent on the identification of the operating system by another one of the operating system identification tests;

wherein a list of open ports on the network node is generated and, based on the list of open ports, fourth identification of which operating system is executed by the network node and fourth confidence level indicating a degree to which the other identification is deemed accurate are generated, wherein making the overall identification of the operating system is further based on the fourth identification and the fourth confidence level; and wherein generating the list of open ports comprises retrieving a previously constructed list of open ports.

25. The method of claim 24, wherein the network node is one of a computer, a router, and a printer.

26. The method of claim 24, wherein transmitting at least a first plurality of Internet Control Message Protocol packets further includes transmitting at least a first User Datagram Protocol packet to the network node and receiving in response at least a second User Datagram Protocol packet, and wherein the generated second identification and the second confidence level are based, in addition to the second plurality of Internet Control Message Protocol packets, on at least the second User Datagram Protocol packet.

27. The method of claim 24, further comprising determining whether NULL session access is available on at least one port configured to run at least one of a Server Message Block service and a NETBIOS service, and if such NULL session access is available, using such NULL session access to determine at least a major version and a minor version of the operating system executed by the network node, and generating, based on the major version and the minor version, a fifth identification of which operating system is executed by the network node and a fifth confidence level indicating a degree to which the fifth identification is deemed accurate, wherein generating the overall identification of the operating system is further based on the fifth identification and the fifth confidence level.

28. The method of claim 24, wherein generating overall identification of an operating system includes selecting as the overall identified operating system the operating system identified by one of the first identification, the second identification, the third identification, and the fourth identification.

29. The method of claim 24, wherein the first plurality of Transmission Control Protocol packets are compliant with a specification of Transmission Control Protocol packets defined by DARPA Request for Comments 793.

30. A method of identifying an operating system executed by a network node, comprising:

executing a plurality of tests for identifying which operating system is executed by a network node, such that each test returns an identification of an operating system executed by the network node;

assessing, based at least on one characteristic of each identification of the operating system returned by the plurality of tests, which of the tests to select for determining an overall identification of the operating system; and generating an overall identification of the operating system executed by the network node as the operating system that is identified by the selected test;

wherein a confidence level is assigned to the identification of the operating system based on a predetermined confidence level stored in association with at least one of a plurality of identification fingerprints used to identify the operating system;

wherein the identification of the operating system by one of the plurality of tests is dependent on the identification of the operating system by another one of the plurality of tests;

wherein a list of open ports on the network node is generated and, based on the list of open ports, another identification of which operating system is executed by the network node and another confidence level indicating a degree to which the other identification is deemed accurate are generated, wherein making the overall identification of the operating system is further based on the other identification and the other confidence level; and wherein generating the list of open ports comprises retrieving a previously constructed list of open ports.

31. The method of claim 30, further comprising resolving conflicts among identifications made by the plurality of tests, wherein the resolving conflicts is based at least in part on comparing aggregated results from at least two of the plurality of tests with a plurality of conflict resolution definitions.

32. The method of claim 30, wherein each of the tests returns an identification of an operating system that is not influenced by the identification returned by any of the other tests.

33. The method of claim 30, wherein the plurality of tests includes at least a first test in which the returned identification of an operating system is generated based on at least connecting to at least one open port on the network node and transmitting to the open port data configured to cause the open port to return at least one banner.

34. The method of claim 33, wherein the plurality of tests further includes at least a second test in which the returned identification of an operating system is generated based on at least generating a list of open ports on the network node.

35. The method of claim 34, wherein at least one characteristic of each operating system identification on which the assessing of a test to rely upon is based is the confidence level that each operating system identification is correct.

36. The method of claim 35, wherein at least one confidence level concerning whether an operating system identification is correct is determined using a fitness calculation.

37. A method of identifying an operating system executed by a network node, comprising:
   executing a plurality of tests for identifying which operating system is executed by a network node, each test producing actual test results indicative of at least an identification of an operating system executed by the network node;
   determining that at least one of the plurality of tests have actual test results that disagree about which operating system is executed by the network node;
   deriving, from the plurality of actual test results, a group of aggregate actual test results that includes at least a portion of at least two of the plurality of actual test results;
   comparing the group of aggregate actual test results with a plurality of conflict resolution definitions and finding a closest match between the group of aggregate actual test results and the conflict resolution definitions, wherein each conflict resolution definition is associated with an operating system that is deemed to be the operating system being executed by the network node; and
   making an overall identification of the operating system executed by the network node, wherein the overall identified operating system is deemed to be the operating system associated with the closest matched conflict resolution definition;
   wherein a confidence level is assigned to the identification of the operating system, based on a predetermined confidence level stored in association with at least one of the plurality of tests used to identify the operating system;
   wherein the identification of the operating system by of the plurality of tests is dependent on the identification of the operating system by another one of the plurality of tests;
   wherein a list of open ports on the network node is generated and, based on the list of open ports, another identification of which operating system is executed by the network node and another confidence level indicating a degree to which the other identification is deemed accurate are generated, wherein making the overall identification of the operating system is further based on the other identification and the other confidence level; and
   wherein generating the list of open ports comprises retrieving a previously constructed list of open ports.

38. The method of claim 37, wherein the actual test results are further indicative of the confidence level indicating a degree to which the identification of an operating system executed by the network node is accurate.

39. The method of claim 37, wherein the plurality of tests includes a first test comprising transmitting a first plurality of Transmission Control Protocol packets to a network node on a computer network, receiving in response a second plurality of Transmission Control Protocol packets, and generating, based on characteristics of the second plurality of Transmission Control Protocol packets, a first identification of which operating system is executed by the network node.

40. The method of claim 39, wherein the plurality of tests further includes a second test comprising transmitting at least a first plurality of Internet Control Message Protocol packets to the network node, receiving in response at least a second plurality of Internet Control Message Protocol packets, and generating, based at least on characteristics of the second plurality of Internet Control Message Protocol packets, a second determination of which operating system is executed by the network node.

41. The method of claim 40, wherein the plurality of tests further includes a third test comprising connecting to at least one open port on the network node, transmitting to the open port data configured to cause the open port to return at least one banner, and generating, based on the at least one banner, a third determination of which operating system is executed by the network node.

42. The method of claim 41, wherein the plurality of tests further includes a fourth test comprising generating the list of open ports on the network node and generating, based on the list of open ports, a fourth determination of which operating system is executed by the network node.

43. The method of claim 42, wherein the plurality of tests further includes a fifth test comprising determining whether NULL session access is available on at least one port configured to run at least one of a Server Message Block service and a NETBIOS service, and if such NULL session access is available, using such NULL session access to determine at least a major version and a minor version of the operating system executed by the network node, and generating, based on the major version and the minor version, a fifth determination of which operating system is executed by the network node.

* * * * *